(12) United States Patent
Matzakos (10) Patent No.: US 9,234,417 B2
(45) Date of Patent: Jan. 12, 2016

(54) SYSTEMS AND METHODS FOR SEPARATING OIL AND/OR GAS MIXTURES

(75) Inventor: Andreas Nicholas Matzakos, Missouri City, TX (US)

(73) Assignee: Shell Oil Company, Houston, TX (US)

( * ) Notice: Subject to any disclaimer, the term of this patent is extended or adjusted under 35 U.S.C. 154(b) by 826 days.

(21) Appl. No.: 13/421,387

(22) Filed: Mar. 15, 2012

(65) Prior Publication Data

US 2013/0068456 A1   Mar. 21, 2013

Related U.S. Application Data

(60) Provisional application No. 61/454,025, filed on Mar. 18, 2011.

(51) Int. Cl.
| | |
|---|---|
| *E21B 43/34* | (2006.01) |
| *E21B 43/16* | (2006.01) |
| *C09K 8/58* | (2006.01) |
| *C10G 1/00* | (2006.01) |
| *C10G 1/04* | (2006.01) |
| *E21B 43/20* | (2006.01) |

(52) U.S. Cl.
CPC . *E21B 43/34* (2013.01); *C09K 8/58* (2013.01); *C10G 1/002* (2013.01); *C10G 1/047* (2013.01); *E21B 43/16* (2013.01); *E21B 43/20* (2013.01); *C10G 2300/44* (2013.01); *C10G 2300/805* (2013.01); *C10G 2400/02* (2013.01); *C10G 2400/04* (2013.01); *C10G 2400/10* (2013.01)

(58) Field of Classification Search
None
See application file for complete search history.

(56) References Cited

U.S. PATENT DOCUMENTS

| | | | |
|---|---|---|---|
| 2,859,818 A | 11/1958 | Hall et al. | 166/9 |
| 2,910,123 A | 10/1959 | Elkins et al. | 166/9 |
| 4,415,032 A | 11/1983 | Shu | |
| 4,587,373 A * | 5/1986 | Hsia | 585/639 |
| 5,607,016 A | 3/1997 | Butler | |
| 2009/0071648 A1 | 3/2009 | Hagen et al. | |

FOREIGN PATENT DOCUMENTS

| | | | |
|---|---|---|---|
| WO | WO2008141051 | 11/2008 | C09K 8/58 |
| WO | WO2010/002693 | * 1/2010 | E21B 43/16 |
| WO | WO2010002693 | 1/2010 | E21B 43/16 |
| WO | WO2011140180 | 11/2011 | E21B 43/20 |

* cited by examiner

*Primary Examiner* — Angela M DiTrani (57) ABSTRACT

A system for producing oil and/or gas from an underground formation comprising a well above the formation; a mechanism to inject an enhanced oil recovery formulation into the formation, the enhanced oil recovery formulation comprising water and a solvent; a mechanism to produce the water, solvent, oil, and gas from the formation; a separator to separate the oil, water, and a first portion of the solvent from the gas and a second portion of the solvent; and an absorption tower to expose the gas and the second portion of the solvent to water to remove the second portion of the solvent from the gas.

8 Claims, 8 Drawing Sheets

Figure 1

Prior Art

SYSTEMS AND METHODS FOR SEPARATING OIL AND/OR GAS MIXTURES

FIELD OF THE INVENTION

The present disclosure relates to systems and methods for producing oil and/or gas mixtures, then separating the mixtures.

BACKGROUND OF THE INVENTION

Enhanced Oil Recovery (EOR) may be used to increase oil recovery in fields worldwide. There are three main types of EOR, thermal, chemical/polymer and gas injection, which may be used to increase oil recovery from a reservoir, beyond what can be achieved by conventional means—possibly extending the life of a field and boosting the oil recovery factor.

Thermal enhanced recovery works by adding heat to the reservoir. The most widely practiced form is a steam drive, which reduces oil viscosity so that it can flow to the producing wells. Chemical flooding increases recovery by reducing the capillary forces that trap residual oil. Polymer flooding improves the sweep efficiency of injected water. Miscible injection works in a similar way as chemical flooding. By injecting a fluid that is miscible with the oil, trapped residual oil can be recovered.

Figure 1:
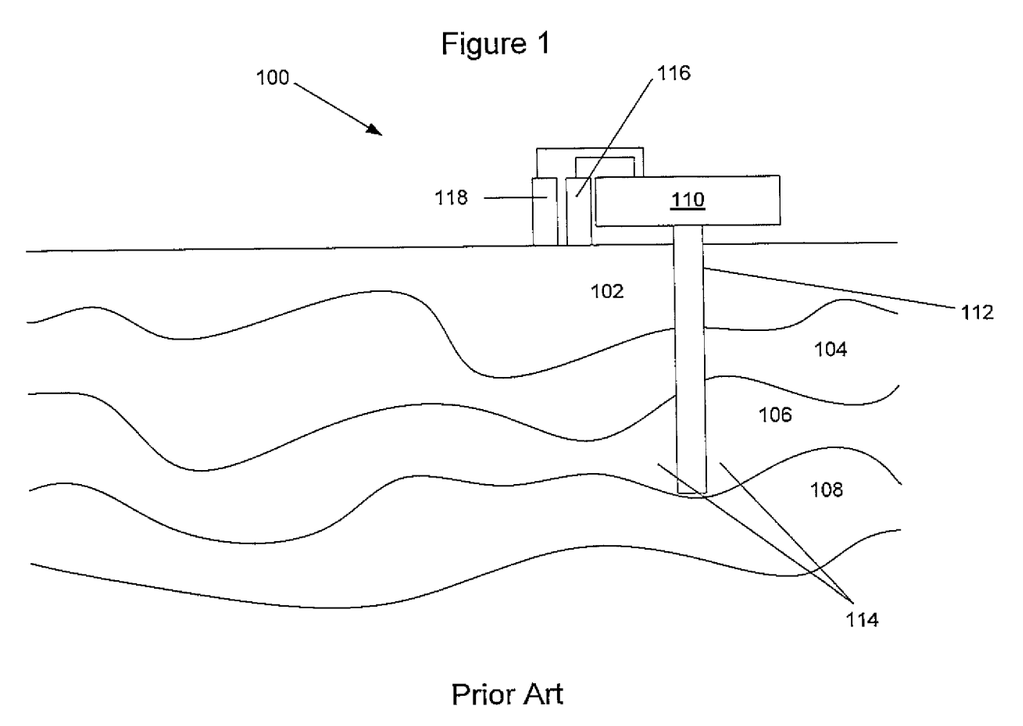
FIG. 1 illustrates a prior art oil and gas production system.

Referring to FIG. 1, there is illustrated prior art system 100. System 100 includes underground formation 102, underground formation 104, underground formation 106, and underground formation 108. Production facility 110 is provided at the surface. Well 112 traverses formations 102 and 104, and terminates in formation 106. The portion of formation 106 is shown at 114. Oil and gas are produced from formation 106 through well 112, to production facility 110. Gas and liquid are separated from each other, gas is stored in gas storage 116 and liquid is stored in liquid storage 118.

U.S. Pat. No. 2,859,818 discloses a method for recovering petroleum from a formation by injecting a solvent. The solvent may be a hydrocarbon solvent such as alcohols, gasoline, kerosene, dimethyl ether, other hydrocarbons having from 2 to 5 carbon atoms, or mixtures. U.S. Pat. No. 2,859,818 is herein incorporated by reference in its entirety.

U.S. Pat. No. 2,910,123 discloses a method for recovering petroleum from a formation by injecting a solvent. The solvent may be a hydrocarbon solvent such as alcohols, gasoline, kerosene, dimethyl ether, other hydrocarbons having from 2 to 5 carbon atoms, or mixtures.

PCT Patent Application Publication WO 2010/02693 discloses a method comprising recovering a carbon source from a formation; converting at least a portion of the carbon source to a synthesis gas; converting at least a portion of the synthesis gas to an ether; and injecting at least a portion of the ether into the formation.

PCT Patent Application Publication WO 2008/141051 discloses a system for producing oil and/or gas from an underground formation including a well above the formation; a mechanism to inject an enhanced oil recovery formulation into the formation, the enhanced oil recovery formulation including dimethyl ether; and a mechanism to produce oil and/or gas from the formation.

PCT Patent Application Publication WO2011/140180 discloses a system for producing oil and/or gas from an underground formation comprising a well above the formation; a mechanism to inject an enhanced oil recovery formulation into the formation, the enhanced oil recovery formulation comprising water and an additive; and a mechanism to produce oil and/or gas from the formation.

There is a need in the art for improved systems and methods for enhanced oil recovery. There is a further need in the art for improved systems and methods for enhanced oil recovery using a solvent enhanced water flood. There is a further need in the art for improved systems and methods for improving the recovery and recycling of a solvent from a EOR flooding operation.

SUMMARY OF THE INVENTION

In one aspect, the invention provides a system for producing oil and gas from an underground formation comprising a well above the formation; a mechanism to inject an enhanced oil recovery formulation into the formation, the enhanced oil recovery formulation comprising water and a solvent; a mechanism to produce the water, solvent, oil, and gas from the formation; a separator to separate the oil, water, and a first portion of the solvent from the gas and a second portion of the solvent; and an absorption tower to expose the gas and the second portion of the solvent to water to remove the second portion of the solvent from the gas.

In another aspect, the invention provides a method for producing oil and gas comprising injecting water and an solvent into a formation; producing a mixture comprising water, the solvent, oil, and gas from the formation; separating the mixture into a first stream comprising oil, water, and a first portion of the solvent, and a second stream comprising gas and a second portion of the solvent.

Advantages of the invention include one or more of the following:

Improved systems and methods for recovery of an enhanced oil recovery solvent.

Improved systems and methods for recycling of an enhanced oil recovery solvent.

Improved systems and methods for enhanced recovery of hydrocarbons from a formation with a solvent enhanced water flood.

Improved systems and methods for enhanced recovery of hydrocarbons from a formation with a water injectant containing an oil soluble or miscible additive.

Improved compositions and/or techniques for secondary recovery of hydrocarbons.

Improved systems and methods for enhanced oil recovery.

Improved systems and methods for enhanced oil recovery using a miscible additive in a water flood.

DETAILED DESCRIPTION OF THE INVENTION

Figure 2A:
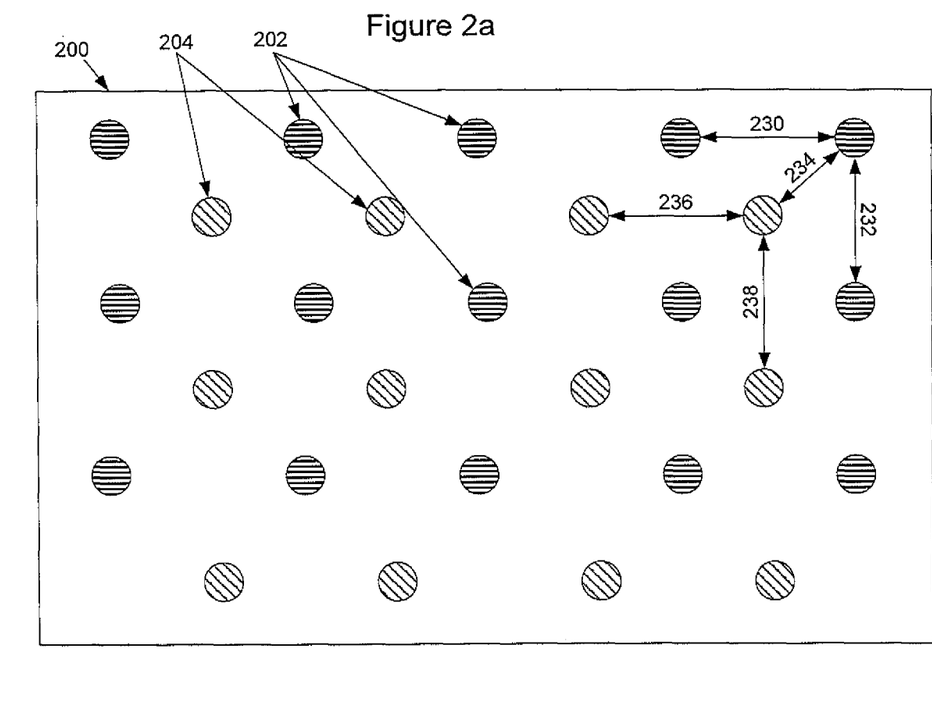
FIG. 2a illustrates a well pattern.
Figure 2B:
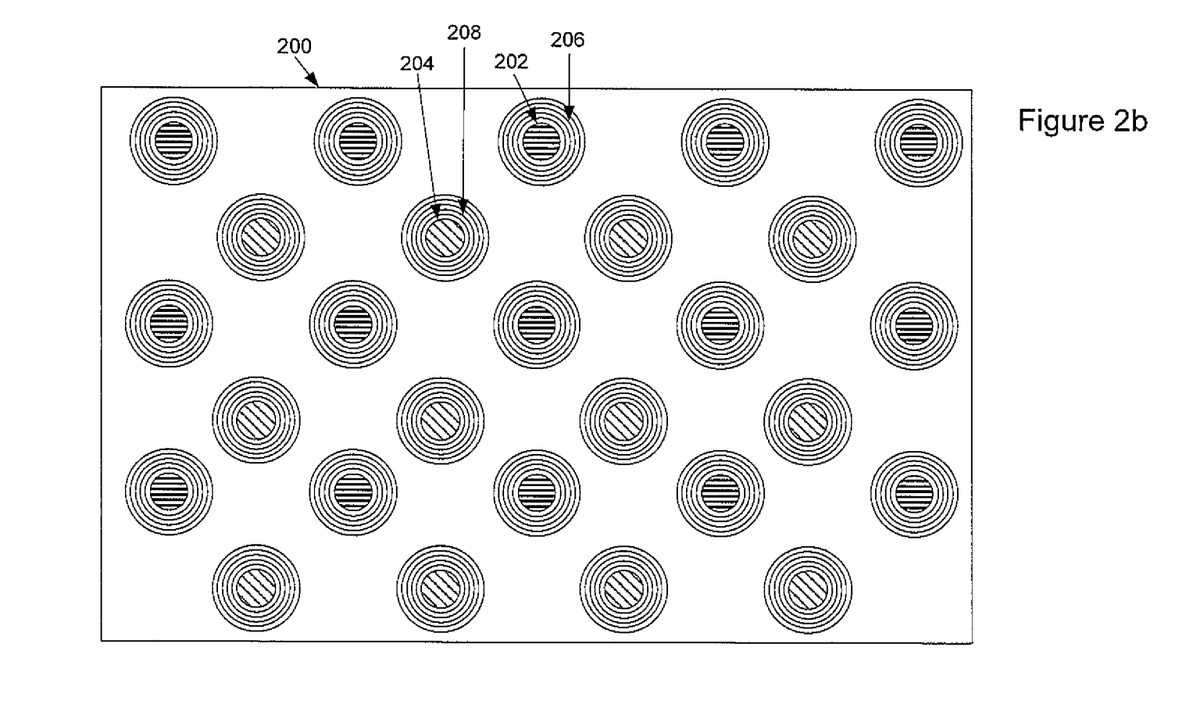
FIGS. 2b and 2c illustrate the well pattern of FIG. 2a during enhanced oil recovery processes.
Figure 2C:
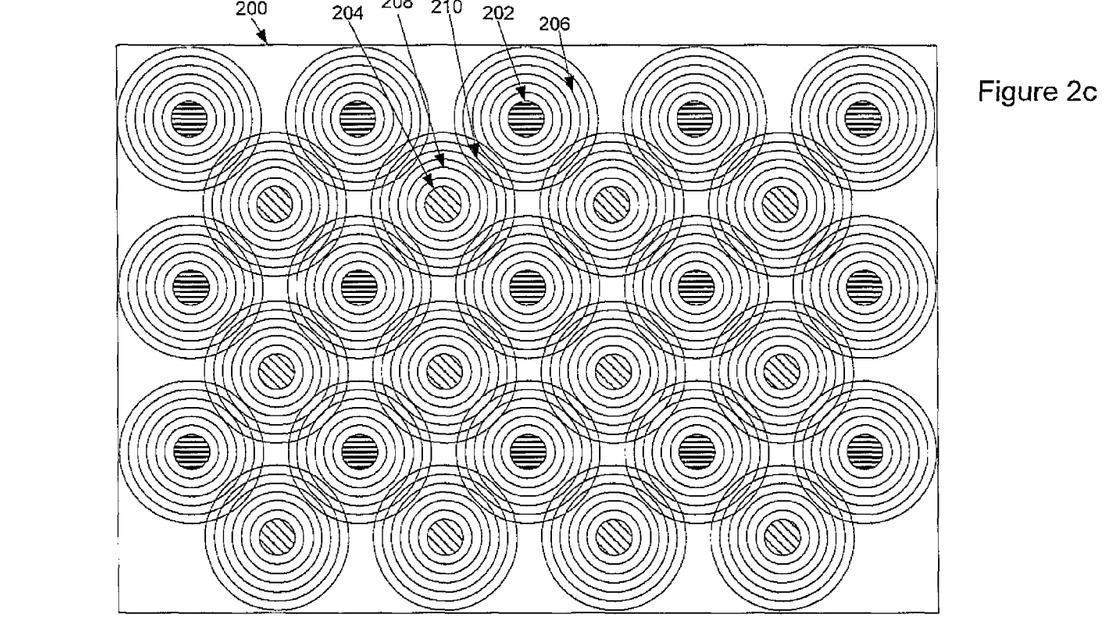

FIGS. 2a, 2b, & 2c:

Referring now to FIG. 2a, in some embodiments, an array of wells 200 is illustrated. Array 200 includes well group 202 (denoted by horizontal lines) and well group 204 (denoted by diagonal lines).

Each well in well group 202 has horizontal distance 230 from the adjacent well in well group 202. Each well in well group 202 has vertical distance 232 from the adjacent well in well group 202.

Each well in well group 204 has horizontal distance 236 from the adjacent well in well group 204. Each well in well group 204 has vertical distance 238 from the adjacent well in well group 204.

Each well in well group 202 is distance 234 from the adjacent wells in well group 204. Each well in well group 204 is distance 234 from the adjacent wells in well group 202.

In some embodiments, each well in well group 202 is surrounded by four wells in well group 204. In some embodiments, each well in well group 204 is surrounded by four wells in well group 202.

In some embodiments, horizontal distance 230 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, vertical distance 232 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, horizontal distance 236 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, vertical distance 238 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, distance 234 is from about 5 to about 1000 meters, or from about 10 to about 500 meters, or from about 20 to about 250 meters, or from about 30 to about 200 meters, or from about 50 to about 150 meters, or from about 90 to about 120 meters, or about 100 meters.

In some embodiments, array of wells 200 may have from about 10 to about 1000 wells, for example from about 5 to about 500 wells in well group 202, and from about 5 to about 500 wells in well group 204.

In some embodiments, array of wells 200 is seen as a top view with well group 202 and well group 204 being vertical wells spaced on a piece of land. In some embodiments, array of wells 200 is seen as a cross-sectional side view with well group 202 and well group 204 being horizontal wells spaced within a formation.

Referring now to FIG. 2b, in some embodiments, array of wells 200 is illustrated. Array 200 includes well group 202 (denoted by horizontal lines) and well group 204 (denoted by diagonal lines).

In some embodiments, a water flooding mixture is injected into well group 204, and oil and gas are recovered from well group 202. As illustrated, the water flooding mixture has injection profile 208, and oil and gas recovery profile 206 is being produced to well group 202.

In some embodiments, a water flooding mixture is injected into well group 202, and oil and gas are recovered from well group 204. As illustrated, the water flooding mixture has injection profile 206, and oil and gas recovery profile 208 is being produced to well group 204.

In some embodiments, well group 202 may be used for injecting a water flooding mixture, and well group 204 may be used for producing oil and gas from the formation for a first time period; then well group 204 may be used for injecting a water flooding mixture, and well group 202 may be used for producing oil and gas from the formation for a second time period, where the first and second time periods comprise a cycle.

In some embodiments, multiple cycles may be conducted which include alternating well groups 202 and 204 between injecting a water flooding mixture, and producing oil and gas from the formation, where one well group is injecting and the other is producing for a first time period, and then they are switched for a second time period.

In some embodiments, a cycle may be from about 12 hours to about 1 year, or from about 3 days to about 6 months, or from about 5 days to about 3 months. In some embodiments, each cycle may increase in time, for example each cycle may be from about 5% to about 10% longer than the previous cycle, for example about 8% longer.

In some embodiments, a water flooding mixture may be injected at the beginning of a cycle, and an immiscible enhanced oil recovery agent or a mixture including an immiscible enhanced oil recovery agent may be injected at the end of the cycle. In some embodiments, the beginning of a cycle may be the first 10% to about 80% of a cycle, or the first 20% to about 60% of a cycle, the first 25% to about 40% of a cycle, and the end may be the remainder of the cycle.

Referring now to FIG. 2c, in some embodiments, array of wells 200 is illustrated. Array 200 includes well group 202 (denoted by horizontal lines) and well group 204 (denoted by diagonal lines).

In some embodiments, a water flooding mixture is injected into well group 204, and oil and gas are recovered from well group 202. As illustrated, the water flooding mixture has injection profile 208 with overlap 210 with oil and gas recovery profile 206, which is being produced to well group 202.

In some embodiments, a water flooding mixture is injected into well group 202, and oil and gas are recovered from well group 204. As illustrated, the water flooding mixture has injection profile 206 with overlap 210 with oil and gas recovery profile 208, which is being produced to well group 204.

Enhanced Oil Recovery Methods

The recovery of oil and gas with array of wells 200 from an underground formation may be accomplished by any known method. Suitable methods include subsea production, surface production, primary, secondary, or tertiary production. The selection of the method used to recover the oil and gas from the underground formation is not critical.

In some embodiments, oil and gas may be recovered from a formation into a well, and flow through the well and flowline to a facility. In some embodiments, enhanced oil recovery, water with the use of an added agent for example a surfactant, a polymer, and/or a miscible agent such as a dimethyl ether formulation or carbon dioxide, may be used to increase the flow of oil and gas from the formation.

Releasing at least a portion of the water flooding mixture and/or other liquids and/or gases may be accomplished by any known method. One suitable method is injecting the water flooding mixture into a single conduit in a single well, allowing the water flooding mixture to soak, and then pumping out at least a portion of the water flooding mixture with gas and liquids. Another suitable method is injecting the water flooding mixture into a first well, and pumping out at least a portion of the water flooding mixture with gas and liquids through a second well. The selection of the method used to inject at least a portion of the water flooding mixture and/or other liquids and/or gases is not critical.

In some embodiments, the water flooding mixture and/or other liquids and/or gases may be pumped into a formation at a pressure up to the fracture pressure of the formation.

In some embodiments, the water flooding mixture may be mixed in with oil and/or gas in a formation to form a mixture which may be recovered from a well. In some embodiments, a quantity of the water flooding mixture may be injected into a well, followed by another component to force the formulation across the formation. For example air, water in liquid or vapor form, carbon dioxide, other gases, other liquids, and/or mixtures thereof may be used to force the water flooding mixture across the formation.

Figure 3A:
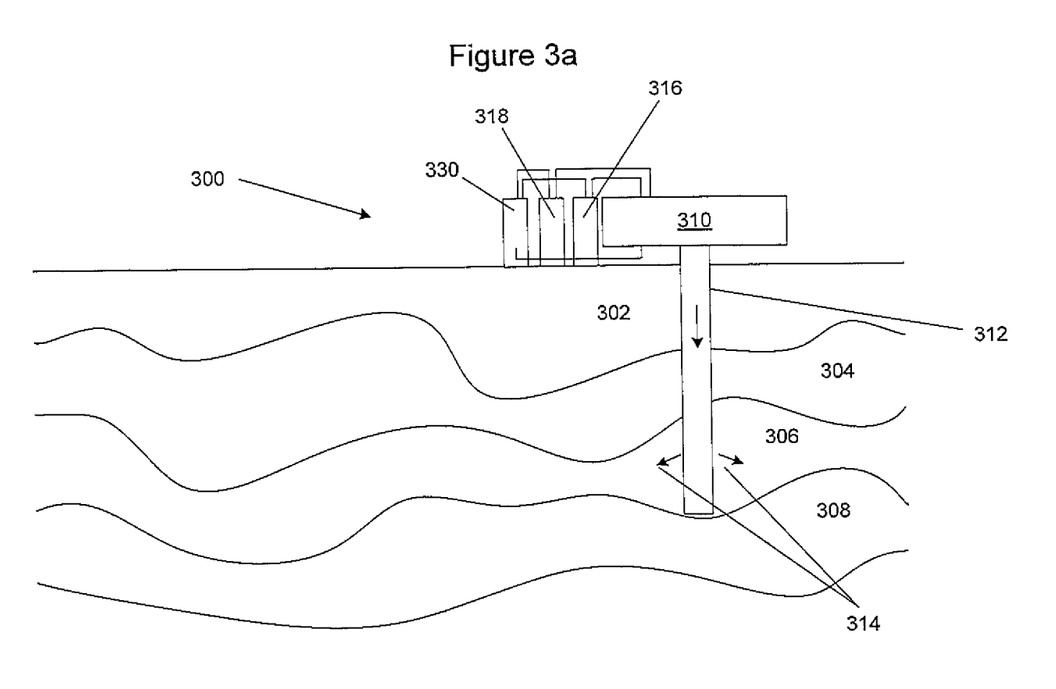
FIGS. 3a-3c illustrate oil and gas production systems.
Figure 3B:
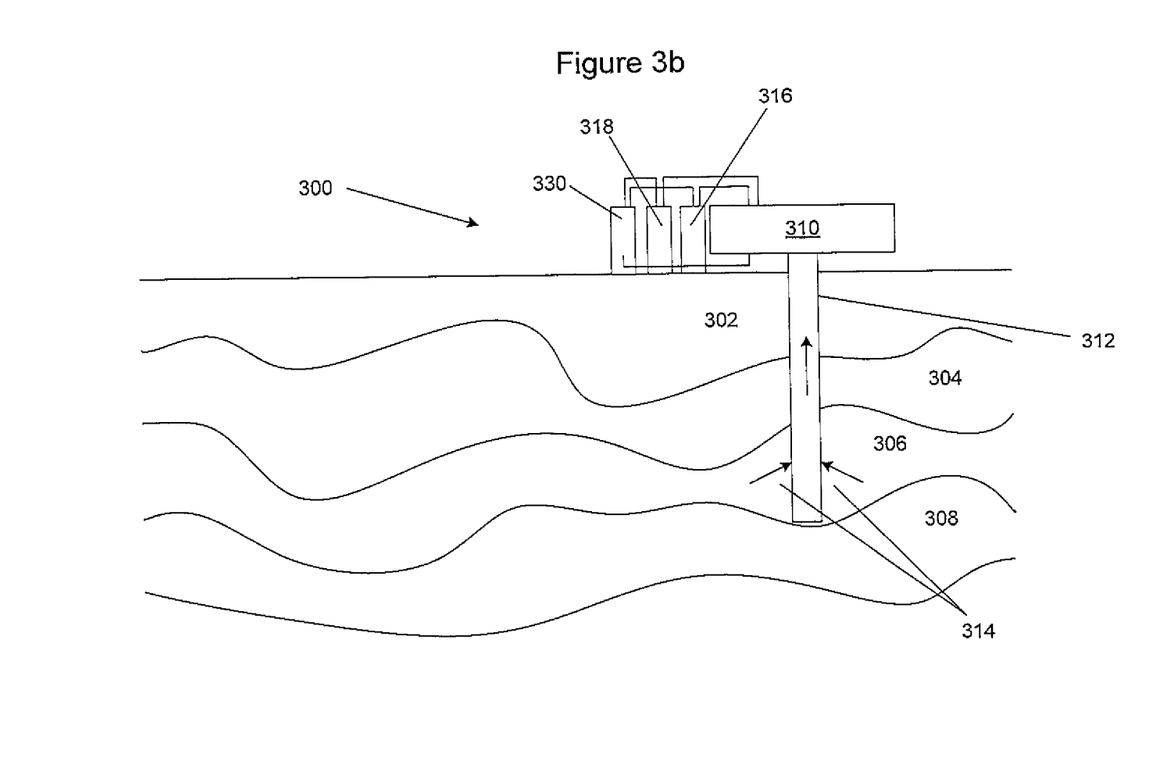

FIGS. 3a & 3b:

Referring now to FIGS. 3a and 3b, in some embodiments of the invention, system 300 is illustrated. System 300 includes underground formation 302, underground formation 304, underground formation 306, and underground formation 308. Facility 310 is provided at the surface. Well 312 traverses formations 302 and 304, and has openings in formation 306. Portions 314 of formation 306 may be optionally fractured and/or perforated. During primary production, oil and gas from formation 306 is produced into portions 314, into well 312, and travels up to facility 310. Facility 310 then separates gas, which is sent to gas processing 316, and liquid, which is sent to liquid processing 318. Facility 310 also includes water flooding mixture storage 330. As shown in FIG. 3a, water flooding mixture may be pumped down well 312 that is shown by the down arrow and pumped into formation 306. Water flooding mixture may be left to soak in formation for a period of time from about 1 hour to about 15 days, for example from about 5 to about 50 hours.

After the soaking period, as shown in FIG. 3b, water flooding mixture and oil and gas is then produced back up well 312 to facility 310. Facility 310 is adapted to separate and/or recycle water flooding mixture, for example by a gravity separation, centrifugal separation, chemical absorption, and/or by boiling the formulation, condensing it or filtering or reacting it, then storing or transporting desirable liquids and gases, and re-injecting and/or disposing of undesirable liquids and gases, for example by repeating the soaking cycle shown in FIGS. 3a and 3b from about 2 to about 5 times.

In some embodiments, water flooding mixture may be pumped into formation 306 below the fracture pressure of the formation, for example from about 40% to about 90% of the fracture pressure.

In some embodiments, well 312, as shown in FIG. 3a, injecting into formation 306 may be representative of a well in well group 202, and well 312 as shown in FIG. 3b, producing from formation 306, may be representative of a well in well group 204.

In some embodiments, well 312 as shown in FIG. 3a, injecting into formation 306, may be representative of a well in well group 204, and well 312, as shown in FIG. 3b, producing from formation 306 may be representative of a well in well group 202.

Figure 3C:
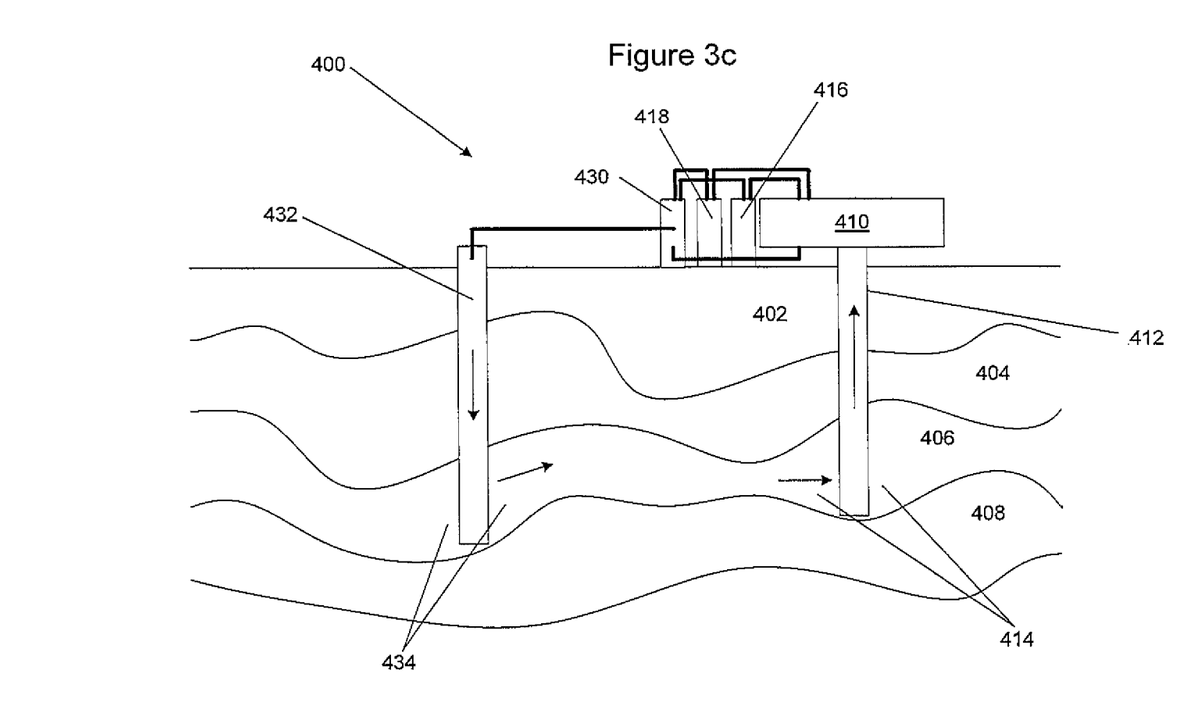

FIG. 3c:

Referring now to FIG. 3c, in some embodiments of the invention, system 400 is illustrated. System 400 includes underground formation 402, formation 404, formation 406, and formation 408. Production facility 410 is provided at the surface. Well 412 traverses formation 402 and 404 has openings at formation 406. Portions of formation 414 may be optionally fractured and/or perforated. As oil and gas is produced from formation 406 it enters portions 414, and travels up well 412 to production facility 410. Gas and liquid may be separated, and gas may be sent to gas processing 416, and liquid may be sent to liquid processing 418. Production facility 410 is able to produce and separate water flooding mixture, which may be produced and stored in production/storage 430. Water flooding mixture is pumped down well 432, to portions 434 of formation 406. Water flooding mixture traverses formation 406 to aid in the production of oil and gas, and then the water flooding mixture, oil and gas may all be produced to well 412, to production facility 410. Water flooding mixture may then be recycled, for example by separating the water flooding mixture from the rest of the production stream, then re-injecting the formulation into well 432.

In some embodiments, a quantity of water flooding mixture or water flooding mixture mixed with other components may be injected into well 432, followed by another component to force water flooding mixture or water flooding mixture mixed with other components across formation 406, for example a liquid, such as water in gas or liquid form; water mixed with one or more salts, polymers, and/or surfactants; or a gas, such as air; carbon dioxide; other gases; other liquids; and/or mixtures thereof.

In some embodiments, well 412 which is producing oil and gas is representative of a well in well group 202, and well 432 which is being used to inject water flooding mixture is representative of a well in well group 204.

In some embodiments, well 412 which is producing oil and gas is representative of a well in well group 204, and well 432 which is being used to inject water flooding mixture is representative of a well in well group 202.

Figure 4:
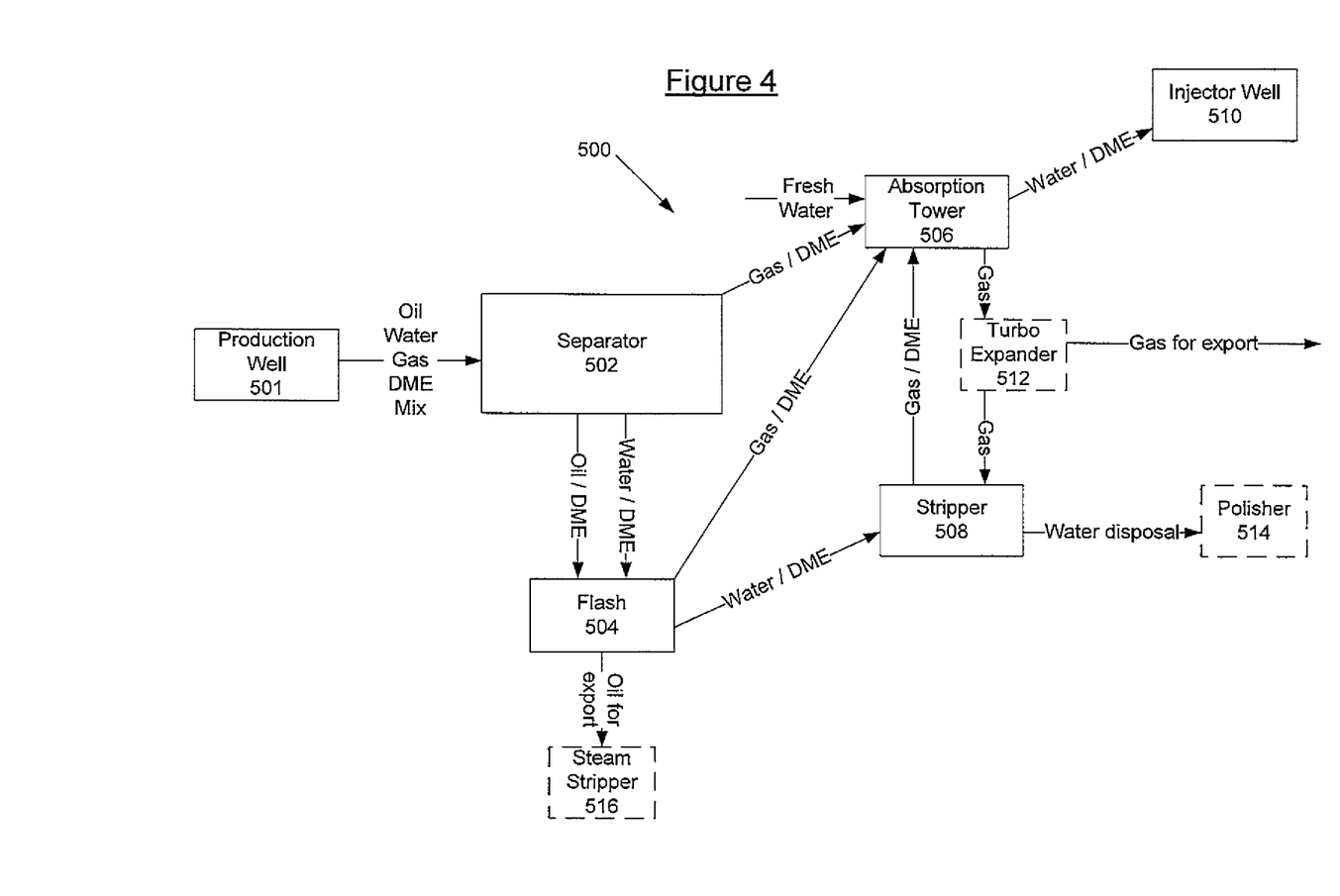
FIG. 4 illustrates a separation system.

FIG. 4:

Referring now to FIG. 4, in some embodiments of the invention, system 500 is illustrated. System 500 includes production well 501 which produces a mixture of oil, water, gas, and a enhanced oil recovery solvent such as dimethyl ether (DME). The mixture is sent to gas liquid separator 502. A gas-DME mixture is taken off the top of separator 502 and sent to absorption tower 506. Oil-DME and water-DME mixtures are sent to flash vessel 504 which operates at a lower pressure than separator 502.

The lower pressure in flash vessel 504 serves to boil off an additional gas-DME mixture which is also sent to absorption tower 506. Flash vessel 504 also separates oil for export which may be sent to a steam stripper 516, and a water-DME mixture which is sent to stripper 508.

In absorption tower 506, the gas-DME mixtures from separator 502 and flash vessel 504 are contacted with fresh water at an elevated pressure such that a portion of the DME is transferred from the gas mixture and absorbed into the fresh water. The water-DME mixture may then be sent to injector well 510 for injection into a subsurface formation for enhanced oil recovery. Alternatively, the water-DME mixture may be sent to a water-DME storage tank (not shown) for storage and subsequently sent to injector well 510 for injection into a subsurface formation for enhanced oil recovery. The lean gas may then optionally be sent to turbo expander 512, and then onto stripper 508. A portion of the lean gas may be exported and/or used for additional DME production.

In the stripper 508, the lean gas is contacted with the water DME mixture from flash vessel 504. Stripper 508 operates at a low pressure and optionally at a high temperature. The low pressure and optionally higher temperature of stripper 508 serves to raise the vapor pressure of the DME which is separated from the water-DME mixture and mixes with the lean gas to create a gas-DME mixture which is sent to absorption tower 506. The water from stripper 508 may optionally be sent to polisher 514 to remove additional DME and then be disposed of, for example by injecting into a subsurface formation.

In some embodiments, the stripper 508 operates at a pressure from vacuum (0.05 bars) up to 10 bars, for example from about 0.1 to about 5 bars, or from about 0.25 to about 2.5 bars, or from about 0.5 to about 1.5 bars.

In some embodiments, the stripper 508 operates at a temperature from about 25 to about 100° C., for example from about 30 to about 90° C., or from about 50 to about 75° C.

In some embodiments, the stripper 508 operates at a lower pressure than absorption tower 506.

In some embodiments, the stripper 508 operates at a higher temperature than absorption tower 506.

In some embodiments, the absorption tower 506 operates at a pressure from 5 bars up to 100 bars, for example from about 10 to about 75 bars, or from about 15 to about 50 bars, or from about 20 to about 30 bars.

In some embodiments, the absorption tower 506 operates at a temperature from about 0 to about 50° C., for example from about 10 to about 45° C., or from about 20 to about 40° C.

In some embodiments, fresh water fed to absorption tower 506 has a molar DME content of less than about 5%, for example less than about 3%, less than about 1%, or less than about 0.5%.

In some embodiments, water-DME mixture fed to stripper 508 has a molar DME content of greater than about 5%, for example greater than about 7.5%, greater than about 10%, up to about 30%, or up to about 25%.

In some embodiments, gas-DME mixture fed to absorption tower 506 has a molar DME content of greater than about 5%, for example greater than about 7.5%, greater than about 10%, up to about 30%, or up to about 25%.

In some embodiments, gas fed to stripper 508 and/or gas for export has a molar DME content of less than about 5%, for example less than about 3%, less than about 1%, or less than about 0.5%.

In some embodiments, water for disposal from stripper 508 has a molar DME content of less than about 5%, for example less than about 3%, less than about 1%, or less than about 0.5%.

In some embodiments, although DME is described above in the specification other solvent or water additives instead of or in addition to DME can also be used.

In some embodiments, oil and/or gas produced may be transported to a refinery and/or a treatment facility. The oil and/or gas may be processed to produced to produce commercial products such as transportation fuels such as gasoline and diesel, heating fuel, lubricants, chemicals, and/or polymers. Processing may include distilling and/or fractionally distilling the oil to produce one or more distillate fractions. In some embodiments, the oil and/or gas, and/or the one or more distillate fractions may be subjected to a process of one or more of the following: catalytic cracking, hydrocracking, hydrotreating, coking, thermal cracking, distilling, reforming, polymerization, isomerization, alkylation, blending, and dewaxing.

Waterflooding Mixture

In some embodiments, oil and gas may be recovered from a formation with a waterflooding mixture.

In some embodiments, the waterflooding mixture may include from about 50% to about 99% water, for example from about 60% to about 98%, from about 70% to about 97%, from about 80% to about 96%, or from about 90% to about 95%.

The selection of water used in the waterflooding mixture is not critical. Suitable water to be used in the mixture could be salt water or fresh water, for example water from a body of water off such as a sea, an ocean, a lake, or a river, from a water well, connate water produced from a subsurface formation, processed water from a city water supply, gray water from a city sewage treatment plant, or another water supply. In some embodiments, water used in the waterflooding mixture may be subjected to one or more processing steps, such as those disclosed in United States Patent Application Publication Number US 2009/0308609, for example, if water with a high salinity content will be used.

The waterflooding mixture may include one or more additives, such as a solvent, to increase its effectiveness, for example by boosting the oil recovery factor, by swelling the oil, by lowering the viscosity of the oil, by increasing the mobility of the oil, and/or by increasing the subsurface pressure in the formation.

In some embodiments, the waterflooding mixture may include from about 1% to about 50% additives, for example from about 2% to about 40%, from about 3% to about 30%, from about 4% to about 20%, or from about 5% to about 10%.

Suitable additives to be used with the waterflooding mixture include chemicals having a molar solubility in water of at least about 1%, for example at least about 2% or at least about 3%, up too fully miscible with water and having an octanol-water partition coefficient of at least about 1, for example greater than about 1.3, greater than about 2, or greater than about 3.

In some embodiments, suitable waterflooding mixture additives are disclosed in co-pending patent application WO-A-2011/140180.

In some embodiments, suitable waterflooding mixture additives include alcohols, amines, pyridines, ethers, carboxylic acids, aldehydes, ketones, phosphates, quinones, and mixtures thereof, where the chemical has a molar solubility in water of at least about 1% and an octanol-water partition coefficient of at least about 1.

In some embodiments, suitable waterflooding mixture additives include ethers such as dimethyl ether, diethyl ether, and methyl-ethyl ether.

There are a number of chemicals that have a high solubility in water, which are in fact fully miscible in water, but which would not be suitable as a waterflooding mixture additive because of their very low partitioning coefficient. In operation, it would be easy to mix these chemicals with water and inject them into a subsurface formation, but a negligible amount of the chemical would then be transferred to the crude oil. In practice, one of these chemicals with a high solubility and a low partitioning coefficient would barely boost the recovery factor as compared to a waterflood by itself.

There are also a number of chemicals that have a high partitioning coefficient, but which would not be suitable as a waterflooding mixture additive because of their very low solubility in water. In operation, only a very small amount of these chemicals could be mixed with water and injected into a subsurface formation, so that only a negligible amount of the chemical would be transferred to the crude oil. In order to achieve a large amount of the chemical been transferred to the crude oil, a huge volume of water would have to be injected. In practice, one of these chemicals with a low solubility and a high partitioning coefficient would barely boost the recovery factor as compared to a waterflood by itself.

Immiscible Enhanced Oil Recovery Agents:

In some embodiments, suitable immiscible enhanced oil recovery agents include liquids or gases, such as water in gas or liquid form, air, nitrogen, mixtures of two or more of the preceding, or other immiscible enhanced oil recovery agents as are known in the art. In some embodiments, suitable immiscible enhanced oil recovery agents are not first contact miscible or multiple contact miscible with oil in the formation.

In some embodiments, a suitable immiscible enhanced oil recovery agent includes water. The selection of water used as the immiscible agent is not critical. Suitable water to be used could be salt water or fresh water, for example water from a body of water off such as a sea, an ocean, a lake, or a river, from a water well, connate water produced from a subsurface formation, processed water from a city water supply, gray water from a city sewage treatment plant, or another water supply. In some embodiments, water used as the immiscible agent may be subjected to one or more processing steps, such as those disclosed in United States Patent Application Publication Number US 2009/0308609, for example, if water with a high salinity content will be used.

In some embodiments, immiscible agents and/or water flooding mixtures injected into the formation may be recovered from the produced oil and gas and re-injected into the formation.

In one embodiment, after the injection of the water flooding mixture is stopped, there is a quantity of oil in the formation which has absorbed a quantity of waterflooding mixture additives. The oil is immobile and can not be recovered. In order to recover the waterflooding mixture additives, a quantity of water without any additives may be injected into the formation and exposed to the oil, which water will absorb the additives, and then the water additive mixture will be produced to the surface.

In some embodiments, oil as present in the formation prior to the injection of any enhanced oil recovery agents has a viscosity of at least about 0.01 centipoise, or at least about 0.1 centipoise, or at least about 0.5 centipoise, or at least about 1 centipoise, or at least about 2 centipoise, or at least about 5 centipoise. In some embodiments, oil as present in the formation prior to the injection of any enhanced oil recovery agents has a viscosity of up to about 500 centipoise, or up to about 100 centipoise, or up to about 50 centipoise, or up to about 25 centipoise.

Surface Processes:

In some embodiments, oil and/or gas may be recovered from a formation with a waterflooding mixture. In order to separate the production fluids, the liquids may be separated from the gases, for example using gravity based and/or centrifugal separators as are known in the art. Then, the liquids may be separated, where the water may be separated from the oil for example using gravity based and/or centrifugal separators as are known in the art. The gas, the oil and the water may still contain some waterflooding mixture additives. The oil may undergo a distillation process to flash the waterflooding mixture additives and light hydrocarbons. This mixture of the waterflooding mixture additives and light hydrocarbons may be added to the gas phase. The gas phase will then be exposed to the water which will preferentially pull out the waterflooding mixture additives and leave behind the light hydrocarbons. At the end of the process, most of the waterflooding mixture additives will have been removed from the oil and gas so that they can be exported, while the water mixed with the waterflooding mixture additives will be ready to be recycled into the same field or stored and used in another field.

Illustrative Embodiments

In one embodiment of the invention, there is disclosed a system for producing oil and gas from an underground formation comprising a well above the formation; a mechanism to inject an enhanced oil recovery formulation into the formation, the enhanced oil recovery formulation comprising water and a solvent; a mechanism to produce the water, solvent, oil, and gas from the formation; a separator to separate the oil, water, and a first portion of the solvent from the gas and a second portion of the solvent; and an absorption tower to expose the gas and the second portion of the solvent to water to remove the second portion of the solvent from the gas. In some embodiments, the system also includes a second well a distance from the first well, wherein the mechanism to produce the water, solvent, oil, and gas from the formation is located at the second well. In some embodiments, the system also includes a stripper to expose the water and a first portion of the solvent to a gas to remove the first portion of the solvent from the water. In some embodiments, the system also includes a first conduit to pass the gas from the absorption tower to the stripper. In some embodiments, the system also includes a turbo expander in the first conduit to lower a pressure of the gas and to extract energy from the gas. In some embodiments, the system also includes a second conduit to pass the water from the stripper to the absorption tower. In some embodiments, the solvent comprises a chemical having a solubility in water of at least 1% (at atmospheric conditions) and a octanol-water partitioning coefficient of at least 1 (at atmospheric conditions). In some embodiments, the well comprises an array of wells from 5 to 500 wells. In some embodiments, the mechanism to produce oil and gas from the formation is located at the well. In some embodiments, the solvent comprises a chemical having a solubility in water of at least 2% at a pressure of 50 bars and a temperature of 25 degrees centigrade. In some embodiments, the solvent comprises a chemical having a crude oil-water partitioning coefficient of at least 2 at a pressure of 50 bars and a temperature of 25 degrees centigrade.

In one embodiment of the invention, there is disclosed a method for producing oil and gas comprising injecting water and an solvent into a formation; producing a mixture comprising water, the solvent, oil and gas from the formation; separating the mixture into a first stream comprising oil, water, and a first portion of the solvent, and a second stream comprising gas and a second portion of the solvent. In some embodiments, the method also includes exposing the second stream to water to remove the second portion of the solvent from the gas. In some embodiments, the method also includes separating oil from the first stream to form a third stream. In some embodiments, the method also includes exposing the third stream to gas to remove the first portion of the solvent from the water. In some embodiments, the method also includes converting at least a portion of the recovered oil or gas into a material selected from the group consisting of transportation fuels such as gasoline and diesel, heating fuel, lubricants, chemicals, and/or polymers. In some embodiments, the water further comprises a water soluble polymer adapted to increase a viscosity of the mixture. In some embodiments, the method also includes reducing a bubble point of the oil in the formation with the solvent. In some embodiments, the method also includes increasing a swelling factor of the oil in the formation with the solvent. In some embodiments, the method also includes reducing a viscosity of the oil in the formation with the solvent. In some embodiments, the water and the solvent is injected into a reservoir having a reservoir temperature of at least 100 degrees centigrade, for example at least 250 degrees centigrade, measured prior to when injection begins. In some embodiments, the underground formation comprises a permeability from 0.0001 to 15 Darcies, for example a permeability from 0.001 to 1 Darcy.

Those of skill in the art will appreciate that many modifications and variations are possible in terms of the disclosed embodiments of the invention, configurations, materials and methods without departing from their spirit and scope. Accordingly, the scope of the claims appended hereafter and their functional equivalents should not be limited by particular embodiments described and illustrated herein, as these are merely exemplary in nature.

The invention claimed is:

1. A system for producing oil from an underground formation comprising:
   a first well located above the formation;
   a mechanism located at the first well to inject an enhanced oil recovery formulation into the formation, the enhanced oil recovery formulation comprising water and a solvent;
   a mechanism to produce water, solvent, oil, and gas from the formation;
   a separator to separate the produced oil, produced water, and a first portion of the produced solvent from the produced gas and a second portion of the produced solvent;
   an absorption tower to expose the separated produced gas and the separated second portion of the solvent to water to remove the second portion of the solvent from the separated gas; and
   a stripper to expose the produced water and the first portion of the produced solvent to a gas to remove the first portion of the produced solvent from the produced water wherein a first conduit passes the separated gas from the absorption tower to the stripper.

2. The system of claim 1, further comprising a second well a distance from the first well, wherein the mechanism to produce the water, solvent, oil, and gas from the formation is located at the second well.

3. The system of claim 1, further comprising a turbo expander in the first conduit to lower pressure of the separated gas and to extract energy from the separated gas.

4. The system of claim 1, further comprising a second conduit to pass the produced water from the stripper to the absorption tower.

5. The system of claim 1, wherein the solvent comprises a chemical having a solubility in water of at least 1% at a temperature of 25° C. and a pressure of 0.101 MPa and a octanol-water partitioning coefficient of at least 1 at 25° C. and a pressure of 0.101 MPa.

6. The system of claim 1, wherein the first well comprises an array of wells from 5 to 500 wells.

7. The system of claim 1, wherein the solvent comprises a chemical having a solubility in water of at least 2% at a pressure of 5 MPa and a temperature of 25° C.

8. The system of claim 1, wherein the solvent comprises a chemical having a crude oil-water partitioning coefficient of at least 2 at a pressure of 5 MPa and a temperature of 25° C.

* * * * *